(12) United States Patent
Numata et al.

(10) Patent No.: US 6,576,215 B1
(45) Date of Patent: Jun. 10, 2003

(54) METHOD FOR PREPARING LITHIUM MANGANATE HAVING SPINEL STRUCTURE

(75) Inventors: Koichi Numata, Takehara (JP); Tsuneyoshi Kamada, Takehara (JP); Takuya Nakashima, Kadoma (JP); Shinji Arimoto, Kadoma (JP)

(73) Assignees: Mitsui Mining & Smelting Co., Ltd. (JP); Matsushita Electric Industrial Co, Ltd. (JP)

( * ) Notice: Subject to any disclaimer, the term of this patent is extended or adjusted under 35 U.S.C. 154(b) by 0 days.

(21) Appl. No.: 09/701,670

(22) PCT Filed: Apr. 6, 2000

(86) PCT No.: PCT/JP00/02211
§ 371 (c)(1),
(2), (4) Date: Nov. 29, 2000

(87) PCT Pub. No.: WO00/61495
PCT Pub. Date: Oct. 19, 2000

(30) Foreign Application Priority Data

Apr. 8, 1999 (JP) ............................................ 11-101272
Apr. 8, 1999 (JP) ............................................ 11-101273

(51) Int. Cl.$^7$ ........................ C01D 15/00; C01G 45/00; H01M 4/50
(52) U.S. Cl. ........................................ 423/599; 429/224
(58) Field of Search ................... 423/599, 50; 205/539; 429/224

(56) References Cited

U.S. PATENT DOCUMENTS

| 5,698,176 | A | | 12/1997 | Capparella et al. |
| 5,742,070 | A | * | 4/1998 | Hayashi et al. ............. 423/599 |
| 5,753,202 | A | * | 5/1998 | Wang et al. ................ 423/599 |
| 6,190,800 | B1 | * | 2/2001 | Iltchev et al. ............... 423/599 |

FOREIGN PATENT DOCUMENTS

| JP | 5-174823 | 7/1993 |
| JP | 9-73902 | 3/1997 |
| JP | 10-116617 | 5/1998 |
| JP | 2000-48817 | 2/2000 |

* cited by examiner

*Primary Examiner*—Steven Bos
(74) *Attorney, Agent, or Firm*—Muserlian, Lucas and Mercanti

(57) ABSTRACT

The process for preparing spinel-type lithium manganate according to the present invention is constituted by a process to admix the electrolyzed manganese dioxide, which is obtained by neutralizing manganese dioxide precipitated by means of electrolysis with any of potassium hydroxide, potassium carbonate and lithium hydroxide, and a lithium material and a process to subject the resulting mixture to a sintering process.

6 Claims, 1 Drawing Sheet

METHOD FOR PREPARING LITHIUM MANGANATE HAVING SPINEL STRUCTURE

Figure 1:
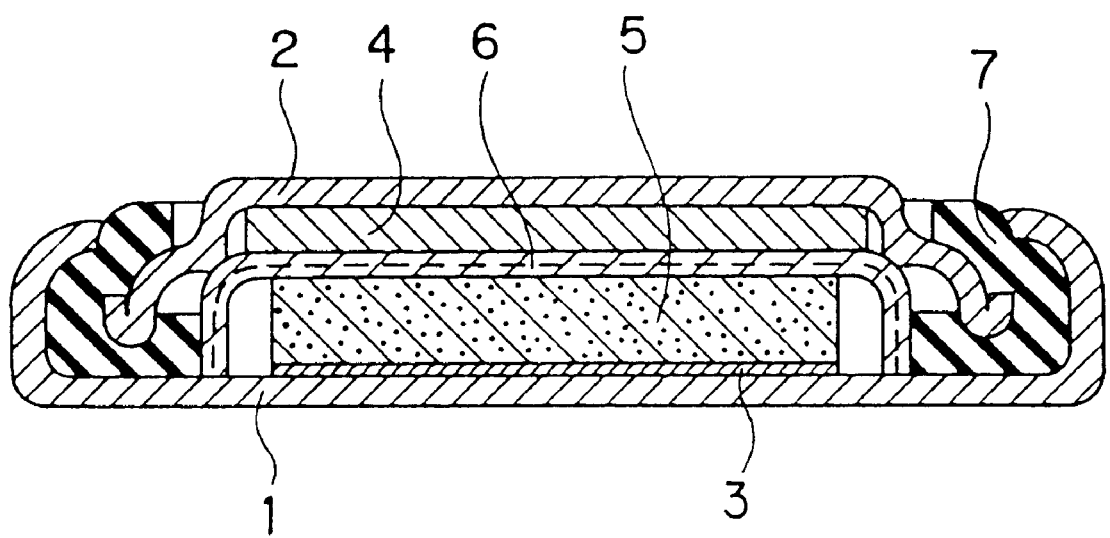

This application is a 371 of PCT/JP00/02211 filed Apr. 6, 2000.

1. Field of Invention

The present invention is directed to a process for preparing spinel-type lithium manganate, and more specifically to a process for preparing spinel-type lithium manganese, from which eluting amount of manganese after prepared it into an anode material for non-aqueous electrolyte secondary battery is reduced, and which can improve performance of the battery under high temperature, such as preservation property and cycle property under high temperature.

2. Background Art

Based on recent rapid shift to miniaturized and cordless electronic hardware, such as personal computers and telephones, a need for using secondary batteries as a driving power source is becoming very intensive. Among the secondary batteries, the biggest interest is directed to non-aqueous electrolyte containing secondary battery since it can be the smallest in size and can generates high energy density. As the anode material for non-aqueous electrolyte containing secondary battery which facilitates such desires as described above, lithium cobaltate ($LiCoO_2$), lithium nickelate ($LiNiO_2$), lithium manganate ($LiMn_2O_4$), etc. can be used, for example. Each of these complex oxides has a voltage more than 4 V to lithium, and therefore, a battery having high energy density can be obtained by using any of such complex oxides.

Among the complex oxides described above, $LiCoO_2$ and $LiNiO_2$ have a theoretical capacity of more or less 280 mAh/g, while $LiMn_2O_4$ has a smaller theoretical capacity of 148 mAh/g. However, $LiMn_2O_4$ can be suitably used for EV use because the resource of the raw material, manganese dioxides, is plenty and is cheaper in cost as well as no cause of thermal instability at charging like $LiNiO_2$.

However, lithium manganate ($LiMn_2O_4$) has a problem of elution of Mn therefrom at a high temperature, which gives inferior battery property, such as preservation and cycle property under high temperature.

Therefore, it is an object of the present invention to provide a process for preparing spinel-type lithium manganate, which can reduce the eluting amount of manganese at charging when it is used as an anode material for non-aqueous electrolyte containing secondary battery and can improve the battery property under high temperature, such as preservation and cycle properties under high temperature, an anode material composed of the lithium manganate and a non-aqueous electrolyte containing secondary battery using the said anode material.

DISCLOSURE OF THE INVENTION

In solving the problem described above, the first invention of the present invention directing to a process for preparing spinel-type lithium manganate is characterized by admixing the electrolyzed manganese dioxide, which is prepared by neutralizing the manganese dioxide precipitated by means of electrolysis with any of potassium hydroxide, potassium carbonate and lithium hydroxide, and a lithium material and then subjecting the resulting mixture to a sintering process.

The second invention of the present invention is directed to the process specified in the first invention, wherein pH of the electrolyzed manganese dioxide being neutralized with either potassium hydroxide or potassium carbonate is 2 or more.

The third invention of the present invention is directed to the process specified in the first invention, wherein the electrolyzed manganese dioxide being neutralized with lithium hydroxide contains lithium in an amount of 0.02–0.5% by weight.

The fourth invention of the present invention is directed to the process specified in the first, second and third inventions described above characterized in that the manganese dioxide is pulverized either before or after the neutralization with any of potassium hydroxide, potassium carbonate and lithium hydroxide.

The fifth invention of the present invention is directed the fourth invention, wherein the average particle size of the pulverized manganese dioxide is in a range of from 5 to 30 μm.

The sixth invention of the present invention is directed to the process specified in any of the first to the fifth inventions, wherein the sintering process is operated at a temperature higher than 750° C.

The seventh invention of the present invention is directed to an anode material to be used for non-aqueous electrolyte containing secondary battery, wherein the anode material is composed of the spinel-type lithium manganate obtained according to the process specified in any of the first to the sixth inventions.

The eighth invention of the present invention is directed to a non-aqueous electrolyte containing secondary battery, wherein the secondary battery is composed of an anode using the anode material for non-aqueous electrolyte containing secondary battery specified in the seventh invention, a cathode capable of occluding and de-occluding either lithium alloy or lithium and non-aqueous electrolyte.

BRIEF EXPLANATION ON DRAWINGS

FIG. 1 is longitudinal section of the coin-type non-aqueous electrolyte containing secondary battery specified in the Examples and Comparative examples described below.

BEST MODE FOR CARRYING OUT THE INVENTION

Now, the present invention is explained in detail with referring the attached drawings.

The present invention is explained hereinbelow, however, it should be noted that the scope of the present invention shall not be limited to the following description.

The process for preparing spinel-type lithium manganate according to the present invention is constituted by a process to admix the electrolyzed manganese dioxide being neutralized beforehand by treating manganese dioxide precipitated by means of electrolysis with any of potassium salt, lithium salt, etc. and a lithium material, and the following process to sinter the resulting mixture.

In the present invention, electrolyzed manganese dioxide is used as the manganese material for the spinel-type lithium manganate.

In the present invention, the electrolyzed manganese dioxide is obtained according to the following process. For example, for the electrolysis, manganese sulfate solution prepared at a fixed concentration is used as an electrolyte, a carbon plate is used for a cathode, and a titanium plate is used for an anode, then electrolysis is proceeded at a fixed current density while heating to electrically precipitate manganese dioxide around the cathode. Then the precipitated manganese dioxide is exfoliated from the anode and is then crushed to particles with a desired particle size, preferably to an average particle size of from 5 to 30 μm.

In the non-aqueous electrolyte containing secondary battery, since the anode material is formed as a film having a thickness of more or less 100 μm, cracking of the film may be caused if the particle size of the electrolyzed manganese dioxide is too large, and formation of an uniform film tends to be difficult. When providing the electrolyzed manganese dioxide having an average particle size of from 5 to 30 μm as the material to produce the spinel-type lithium manganate, an anode material suitable to be used for film formation can be obtained without subjecting the manganese dioxide to an additional pulverization process. Therefore, it is estimated that the uniform distribution of potassium can be facilitated by neutralization of the micronized electrolyzed-manganese dioxide with a potassium salt.

The electrolyzed manganese dioxide pulverized into a desire particle size is then neutralized with either a potassium salt or a lithium salt, washed and followed by drying.

As the potassium salt used for the neutralization, any potassium salts can be used, but it is particularly preferable to use either potassium hydroxide or potassium carbonate. Additionally, there is no limitation in order for the pulverization and the neutralization, so the pulverization process may be carried out following to the neutralization process.

The pH of the electrolyzed manganese dioxide being neutralized with the potassium salt is 2 or more, and is more preferably in a range of from 2 to 5.5, and further preferable in a range of from 2 to 4. If the pH is too high, though eluting amount of manganese under high temperature can be reduced, the initial discharge capacity decreases, whereas, when the pH is lower than 2, the eluting amount of manganese cannot be lowered.

For the neutralization with a lithium salt, any lithium salts can be preferably used, however, it is particularly preferable to neutralize with lithium hydroxide.

There is no limitation in the order for the pulverization and the neutralization, thus pulverization may be done after completing the neutralization.

The amount of lithium contained in the electrolyzed manganese dioxide being neutralized with the lithium salt is preferably in a range of from 0.02 to 0.5% by weight. Though eluting amount of manganese at a high temperature may decrease, but the initial discharge capacity may be reduced when the lithium amount is more than 0.5% by weight, while the performance of the electrolyzed manganese dioxide may be insufficient when the lithium amount is less than 0.02% by weight.

In the process described above, the same sintering process as described in the process where employing the neutralization with a potassium salt as described above.

In the present invention, the spinel-type lithium manganate is obtained by admixing the electrolyzed manganese dioxide, which has been neutralized with either a potassium salt or a lithium salt beforehand, and the lithium material and subsequently sintering the resulting mixture. As the lithium material, lithium carbonate ($Li_2CO_3$), lithium sulfate ($LiNO_3$), lithium hydroxide (LiOH) and the like can be used, for example. The Li/Mn molar ratio for the electrolyzed manganese dioxide and the lithium material is preferably in a range of from 0.50 to 0.60.

For acquiring larger reaction area, it is also preferable to pulverize the electrolyzed manganese dioxide and the lithium material either before or after admixing them. The weighed and admixed materials can be used either directly or after making them into granules. The granulation may be done by either wet or dry method, and a process, such as extruding granulation, rotary granulation, fluid granulation, mixing granulation, spray drying granulation, pressure molding granulation, and flake granulation using rollers or the like, can be employed.

The materials obtained as described above are put into a furnace for sintering and are sintered at a temperature of from 600 to 1,000° C. to obtain the spinel-type lithiun manganate. For obtaining spinel-type lithium manganate in monolayer, it is sufficient to apply temperature around 600° C., however, it is preferable for the sintering to apply temperature higher than 750° C., and more preferably higher than 850° C., since the granule growth does not proceed when the temperature for sintering is lower than such range. As the furnace for sintering used in the process, rotary kiln, stationary furnace and the like can be given as the example. Time for the sintering should be more than 1 hour, and preferably 5 to 20 hours, in order to make the reaction uniform.

As described above, the spinel-type lithium manganate containing a certain amount of either potassium or lithium can be obtained. The spinel-type lithium manganate containing potassium is used as an anode material for the non-aqueous electrolyte containing secondary battery.

For the non-aqueous electrolyte containing secondary battery according to the present invention, a mixed material of the said anode material, a conductive material, such as carbon black, and a binding agent, such as teflon (Trade name for polytetrafluoro ethylene), is provided as an anode, either a lithium alloy or a material like carbon capable of occluding and de-occluding lithium is used as a cathode, and a mixture of lithium hexafluorophosphate ($LiPF_6$) and a mixed solvent of ethylene carbonate and dimethylcarbonate or the like, or the one prepared into an electrolyte in gel, is used as the non-aqueous electrolyte, however, there is no limitation to such materials exemplified above.

Since the non-aqueous electrolyte containing secondary battery according to the present invention can control the elution of manganese at charging condition, it can improve battery performance under high temperature, such as preservation property under high temperature and cycle property under high temperature.

EXAMPLES

Now, the present invention is definitely explained with referring the examples described below, however, it should be noted that the scope of the present invention shall not be limited to the description in the following examples.
<Examples for employing neutralization with potassium salt>

EXAMPLE 1

As an electrolyte for manganese, aqueous solution of manganese sulfate containing sulfuric acid at a concentration of 50 g/L and manganese at a concentration of 40 g/L was prepared. Heating was applied to the electrolyte so as to raise the temperature thereof to 95° C., and electrolysis was carried out by using a carbon plate as a cathode and a titanium plate as an anode at current density of 60 A/$m^2$. Then, manganese dioxide electrically precipitated onto the anode was exfoliated and was crashed into chips with a size of less than 7 mm, and the chips were further pulverized into particles with an average particle size of 20 μm.

The manganese dioxide in an amount of 20 kg was washed with 20 liters water, then the water was removed, and another 20 liters water was added to the manganese dioxide. Then, potassium hydroxide in an amount of 75 g was dissolved in the manganese dioxide solution, then the solution was subjected to neutralization for 24 hours while stirring, and the solution was then washed with water, filtrated and dried at 50° C. for 12 hours. The pH and potassium content of the obtained powder were measured according to the method of JIS K-1467-1984, and the results are shown in Table 1 below.

The manganese dioxide with the average particle size of 20 μm in an amount of 1 kg was added with lithium carbonate so as to adjust Li/Mn molar ratio in the mixture at 0.54, and the mixture was then mixed and subjected to sintering process in a box-type furnace at 800° C. for 20 hours to obtain the spinel-type lithium manganate.

An anode complex material was prepared by admixing the spinel-type lithium manganate in an amount of 80 parts by weight obtained as described above, carbon black in an amount of 15 parts by weight as a conductive agent and polytetrafluoro ethylene in an amount of 5 parts by weight as a binding agent.

By using the anode complex material, a coin-type non-aqueous electrolyte containing secondary battery shown in FIG. 1 was prepared. As shown in FIG. 1, a current collector 3 made of stainless steel is attached by means of spot welding onto the interior wall of an anode case 1 made of stainless steel, which is resistant to an organic electrolyte. An anode 5 composed of the said anode complex material is sealed with pressure onto the upper side of the current collector 3. On the upper side of the anode 5, a separator 6 made of microporous polypropyrene resin being sopped in the electrolyte is located. At the opening part of the anode case 1, a closing cap 2, of which lower side a cathode 4 composed of metal lithium is attached, is located in between the anode case and a gasket 7 made of polypropyrene. The closing cap 2 is also functioning as a cathode terminate and is made of stainless steel as well as the anode case 1. The diameter of the battery is 20 mm, and the height is 1.6 mm. As the electrolyte, a solution prepared by equivalently mixing ethylene carbonate and 1,3-dimethoxy ethane in volume was used as a solvent, and lithium hexafluorophosphate was used as a solute and was added into the solvent at a rate of 1 mol/liter to obtain the electrolyte.

The battery obtained as describe above was subjected to charging tests. The charging test was carried out under a temperature of 20° C. at a voltage ranging from 4.3 to 3.0 V, and the current density was fixed at 0.5 mA/cm$^2$. Further, the battery was charged at a voltage of 4.3 V and was stored for 3 days at 80° C., and the preservation property of the battery was checked based on capacity preserving rate, which is calculated from the discharging capacity of the battery. The results of the initial discharging capacity and the preservation capacity maintaining rate are shown in Table 1 below.

EXAMPLE 2

According to the same process described in the Example 1 except changing the adding amount of potassium hydroxide to 110 g at the neutralization of the electrolyzed manganese dioxide, synthesis for the spinel-type lithium manganate was carried out. The pH and the potassium content after the neutralization is shown in Table 1. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 1 presented below.

EXAMPLE 3

According to the same process described in the Example 1 except changing the adding amount of potassium hydroxide to 140 g at the neutralization of the electrolyzed manganese dioxide, synthesis for the spinel-type lithium manganate was carried out. The pH and the potassium content after the neutralization is shown in Table 1. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 1 presented below.

EXAMPLE 4

According to the same process described in the Example 1 except changing the adding amount of potassium hydroxide to 200 g at the neutralization of the electrolyzed manganese dioxide, synthesis for the spinel-type lithium manganate was carried out. The pH and the potassium content after the neutralization is shown in Table 1. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 1 presented below.

EXAMPLE 5

According to the same process described in the Example 1 except changing the adding amount of potassium hydroxide to 280 g at the neutralization of the electrolyzed manganese dioxide, synthesis for the spinel-type lithium manganate was carried out. The pH and the potassium content after the neutralization is shown in Table 1. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 1 presented below.

EXAMPLE 6

According to the same process described in the Example 2 except changing the temperature applied for the sintering to 900° C., synthesis for the spinel-type lithium manganate was carried out. The pH and the potassium content after the neutralization is shown in Table 1. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 1 presented below.

EXAMPLE 7

According to the same process described in the Example 2 except changing the temperature applied for the sintering to 700° C., synthesis for the spinel-type lithium manganate was carried out. The pH and the potassium content after the neutralization is shown in Table 1. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 1 presented below.

Comparative Example 1

According to the same process described in the Example 1 except omitting the neutralization process for the electrolyzed manganese dioxide, namely the adding amount of potassium hydroxide is 0 g, synthesis for the spinel-type lithium manganate was carried out. The pH and the potassium content after the neutralization is shown in Table 1. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 1 presented below.

TABLE 1

|  | JIS pH | K (% by weight) | Initial Discharging Capacity (mAh/g) | Preservation Capacity Maintaining Rate under High Temperature (%) |
| --- | --- | --- | --- | --- |
| Example 1 | 2.5 | 0.17 | 121 | 72 |
| Example 2 | 3.5 | 0.35 | 118 | 78 |
| Example 3 | 4.5 | 0.60 | 115 | 81 |
| Example 4 | 5.0 | 0.70 | 113 | 84 |
| Example 5 | 6.0 | 1.00 | 108 | 86 |
| Example 6 | 3.5 | 0.35 | 115 | 87 |
| Example 7 | 3.5 | 0.35 | 118 | 71 |
| Comparative Example 1 | 1.7 | 0 | 124 | 64 |

EXAMPLE 8

According to the same process described in the Example 1 except changing the average particle size of the electrolyzed manganese dioxide at the pulverization to 5 $\mu$m, synthesis of the spinel-type lithium manganate was carried out. A coin-type non-aqueous electrolyte containing secondary battery was prepared by using the spinel-type lithium manganate as the anode material according to the process disclosed in the Example 1. Then, the performance of the secondary battery was checked based on two current densities, 0.5 mA/cm$^2$ and 1.0 mA/cm$^2$. The discharging capacity at the current density of 0.5 mA/cm2 is fixed to 100, and the discharging capacity rate at the current density of 1.0 mA/cm$^2$ is represented as current load rate. The obtained current load rates are shown in Table 2 presented below.

EXAMPLE 9

The same examination as done in the Example 8 was carried out for the coin-type non-aqueous electrolyte containing secondary battery prepared in the Example 1. The current load rate obtained is shown in Table 2 below.

EXAMPLE 10

According to the same process described in the Example 1 except changing the average particle size of the electrolyzed manganese dioxide at the pulverization to 30 $\mu$m, synthesis of the spinel-type lithium manganate was carried out. A coin-type non-aqueous electrolyte containing secondary battery was prepared by using the spinel-type lithium manganate as the anode material according to the process disclosed in the Example 1, and the same examination as done in the Example 8 was carried out for the obtained secondary battery. The current load rate obtained is shown in Table 2 below.

EXAMPLE 11

According to the same process described in the Example 1 except changing the average particle size of the electrolyzed manganese dioxide at the pulverization to 35 $\mu$m, synthesis of the spinel-type lithium manganate was carried out. A coin-type non-aqueous electrolyte containing secondary battery was prepared by using the spinel-type lithium manganate as the anode material according to the process disclosed in the Example 1, and the same examination as done in the Example 8 was carried out for the obtained secondary battery. The current load rate obtained is shown in Table 2 below.

TABLE 2

|  | Average Particle Size ($\mu$m) | Current Load Rate (%) |
| --- | --- | --- |
| Example 8 | 5 | 93 |
| Example 9 | 20 | 88 |
| Example 10 | 30 | 85 |
| Example 11 | 35 | 74 |

<Examples for employing Neutralization with Lithium Salt>

EXAMPLE 12

As an electrolyte for manganese, aqueous solution of manganese sulfate containing sulfuric acid at a concentration of 50 g/L and manganese at a concentration of 40 g/L was prepared. Heating was applied to the electrolyte so as to raise the temperature thereof to 95° C., and electrolysis was carried out by using a carbon plate as a cathode and a titanium plate as an anode at current density of 60 A/m$^2$. Then, manganese dioxide electrically precipitated onto the anode was exfoliated and was crashed into chips with a size of less than 7 mm, and the chips were further pulverized into particles with an average particle size of 20 $\mu$m.

The manganese dioxide in an amount of 20 kg was washed with 20 liters water, then the water was removed, and another 20 liters water was added to the manganese dioxide. Then, lithium hydroxide in an amount of 35 g was dissolved in the manganese dioxide solution, then the solution was subjected to neutralization for 24 hours while stirring, then the solution was washed with water, filtrated and dried at 50° C. for 12 hours. The lithium content in the obtained powder was measured and the results are shown in Table 3 below.

The manganese dioxide with the average particle size of 20 min an amount of 1 kg was added with lithium carbonate so as to adjust Li/Mn molar ratio in the mixture at 0.54, and the mixture was then mixed and subjected to sintering process in a box-type furnace at 800° C. for 20 hours to obtain the spinel-type lithium manganate.

An anode complex material was prepared by admixing the spinel-type lithium manganate in an amount of 80 parts by weight obtained as described above, carbon black in an amount of 15 parts by weight as a conductive agent and polytetrafluoro ethylene in an amount of 5 parts by weight as a binding agent.

By using the anode complex material, a coin-type non-aqueous electrolyte containing secondary battery shown in FIG. 1 was prepared. As shown in FIG. 1, a current collector 3 made of stainless steel is attached by means of spot welding onto the interior wall of an anode case 1 made of stainless steel, which is resistant to an organic electrolyte. An anode 5 composed of the said anode complex material is sealed with pressure onto the upper side of the current collector 3. On the upper side of the anode 5, a separator 6 made of microporous polypropyrene resin being sopped in the electrolyte is located. At the opening part of the anode case 1, a closing cap 2, of which lower side a cathode 4 composed of metal lithium is attached, is located in between the anode case and a gasket 7 made of polypropyrene. The closing cap 2 is also functioning as a cathode terminate and is made of stainless steel as well as the anode case 1. The diameter of the battery is 20 mm, and the height is 1.6 mm. As the electrolyte, a solution prepared by equivalently mixing ethylene carbonate and 1,3-dimethoxy ethane in volume was used as a solvent, and lithium hexafluorophosphate was used as a solute and was added into the solvent at a rate of 1 mol/liter to obtain the electrolyte.

The battery obtained as describe above was subjected to charging tests. The charging test was carried out under a temperature of 20° C. at a voltage ranging from 4.3 to 3.0 V, and the current density was fixed at 0.5 mA/cm$^2$. Further, the battery was charged at a voltage of 4.3 V and was stored for 3 days at 80° C., and the preservation property of the battery was checked based on capacity preserving rate, which is calculated from the discharging capacity of the battery. The results of the initial discharging capacity and the preservation capacity maintaining rate are shown in Table 3 below.

EXAMPLE 13

According to the same process described in the Example 1 except changing the adding amount of lithium hydroxide to 55 g at the neutralization of the electrolyzed manganese dioxide, synthesis for the spinel-type lithium manganate was carried out. The lithium content in the spinel-type lithium manganate is shown in Table 3. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 3 presented below.

EXAMPLE 14

According to the same process described in the Example 1 except changing the adding amount of lithium hydroxide to 85 g at the neutralization of the electrolyzed manganese dioxide, synthesis for the spinel-type lithium manganate was carried out. The lithium content in the spinel-type lithium manganate is shown in Table 3. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 3 presented below.

EXAMPLE 15

According to the same process described in the Example 1 except changing the adding amount of lithium hydroxide to 130 g at the neutralization of the electrolyzed manganese dioxide, synthesis for the spinel-type lithium manganate was carried out. The lithium content in the spinel-type lithium manganate is shown in Table 3. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 3 presented below.

EXAMPLE 16

According to the same process described in the Example 1 except changing the adding amount of lithium hydroxide to 180 g at the neutralization of the electrolyzed manganese dioxide, synthesis for the spinel-type lithium manganate was carried out. The lithium content in the spinel-type lithium manganate is shown in Table 3. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 3 presented below.

EXAMPLE 17

According to the same process described in the Example 2 except changing the temperature applied for the sintering to 900° C., the synthesis for the spinel-type lithium manganate was carried out. The lithium content in the spinel-type lithium manganate is shown in Table 3. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 3 presented below.

EXAMPLE 18

According to the same process described in the Example 2 except changing the temperature applied for the sintering to 700° C., the synthesis for the spinel-type lithium manganate was carried out. The lithium content in the spinel-type lithium manganate is shown in Table 3. Also, a coin-type non-aqueous electrolyte containing secondary battery was prepared by using the spinel-type lithium manganate as the anode material according to the process disclosed in the Example 1. Then, the initial discharging capacity and the preservation capacity maintaining rate under high temperature of the secondary battery was measured, and the results are shown in Table 3 presented below.

TABLE 3

|  | Li (% by weight) | Initial Discharging Capacity (mAh/g) | Preservation Capacity Maintaining Rate Under High Temp. (%) |
| --- | --- | --- | --- |
| Example 12 | 0.02 | 123 | 69 |
| Example 13 | 0.09 | 121 | 75 |
| Example 14 | 0.13 | 118 | 78 |
| Example 15 | 0.17 | 115 | 81 |

TABLE 3-continued

|  | Li (% by weight) | Initial Discharging Capacity (mAh/g) | Preservation Capacity Maintaining Rate Under High Temp. (%) |
|---|---|---|---|
| Example 16 | 0.23 | 110 | 84 |
| Example 17 | 0.09 | 116 | 85 |
| Example 18 | 0.09 | 121 | 68 |

EXAMPLE 19

According to the same process described in the Example 1 except changing the average particle size of the electrolyzed manganese dioxide at the pulverization to 5 μm, synthesis of the spinel-type lithium manganate was carried out. A coin-type non-aqueous electrolyte containing secondary battery was prepared by using the spinel-type lithium manganate as the anode material according to the process disclosed in the Example 1. Then, the performance of the secondary battery was checked based on two current densities, 0.5 mA/cm$^2$ and 1.0 mA/cm$^2$. The discharging capacity at the current density of 0.5 mA/cm$^2$ is fixed to 100, and the discharging capacity rate at the current density of 1.0 mA/cm$^2$ is represented as current load rate. The current load rates obtained are shown in Table 4 presented below.

EXAMPLE 20

The same examination as done in the Example 8 was carried out for the coin-type non-aqueous electrolyte containing secondary battery prepared in the Example 1. The current load rate obtained is shown in Table 2 below.

EXAMPLE 21

According to the same process described in the Example 1 except changing the average particle size of the electrolyzed manganese dioxide at the pulverization to 30 μm, synthesis of the spinel-type lithium manganate was carried out. A coin-type non-aqueous electrolyte containing secondary battery was prepared by using the spinel-type lithium manganate as the anode material according to the process disclosed in the Example 1, and the same examination as done in the Example 8 was carried out for the obtained secondary battery. The current load rate obtained is shown in Table 4 below.

EXAMPLE 22

According to the same process described in the Example 1 except changing the average particle size of the electrolyzed manganese dioxide at the pulverization to 35 μm, synthesis of the spinel-type lithium manganate was carried out. A coin-type non-aqueous electrolyte containing secondary battery was prepared by using the spinel-type lithium manganate as the anode material according to the process disclosed in the Example 1, and the same examination as done in the Example 8 was carried out for the obtained secondary battery. The current load rate obtained is shown in Table 4 below.

TABLE 4

|  | Average Particle Size (μm) | Current Load Rate (%) |
|---|---|---|
| Example 19 | 5 | 94 |
| Example 20 | 20 | 89 |
| Example 21 | 30 | 86 |
| Example 22 | 35 | 76 |

INDUSTRIAL USE

As described above, by using the spinel-type lithium manganate obtained according to the process specified in the present invention as the anode material for the non-aqueous electrolyte containing secondary battery, control of manganese elution from the battery at charging, improvement of high temperature battery property, such as preservation property under high temperature and cycle property under high temperature, and improvement of the current load rate of the secondary battery can be achieved.

What is claimed is:

1. A process for the preparation of spinel lithium manganate comprising electrolyzing an aqueous solution of manganese to precipitate manganese dioxide, adding at least one member of the group consisting of potassium hydroxide and potassium carbonate to a mixture of the manganese dioxide and water with a pH of at least 2 to neutralize the mixture, adding a lithium compound to the mixture, and sintering the mixture to obtain spinel lithium manganate.

2. The process of claim 1 wherein the manganese dioxide is pulverized either before or after the neutralization.

3. The process of claim 2, wherein the average particle size of the pulverized manganese dioxide is from 5 to 30 μm.

4. The process of claim 1, wherein the sintering process is effected at a temperature higher than 750° C.

5. An anode material for a non-aqueous electrolyte containing secondary battery comprising spinel lithium manganate obtained by the process of claim 1.

6. A non-aqueous electrolyte containing secondary battery comprising an anode of claim 5, a cathode capable of occluding or de-occluding lithium alloy or lithium and a non-aqueous electrolyte.

* * * * *